(No Model.)
F. GLEASON.
LOOSE PULLEY LUBRICATOR.
No. 310,669. Patented Jan. 13, 1885.
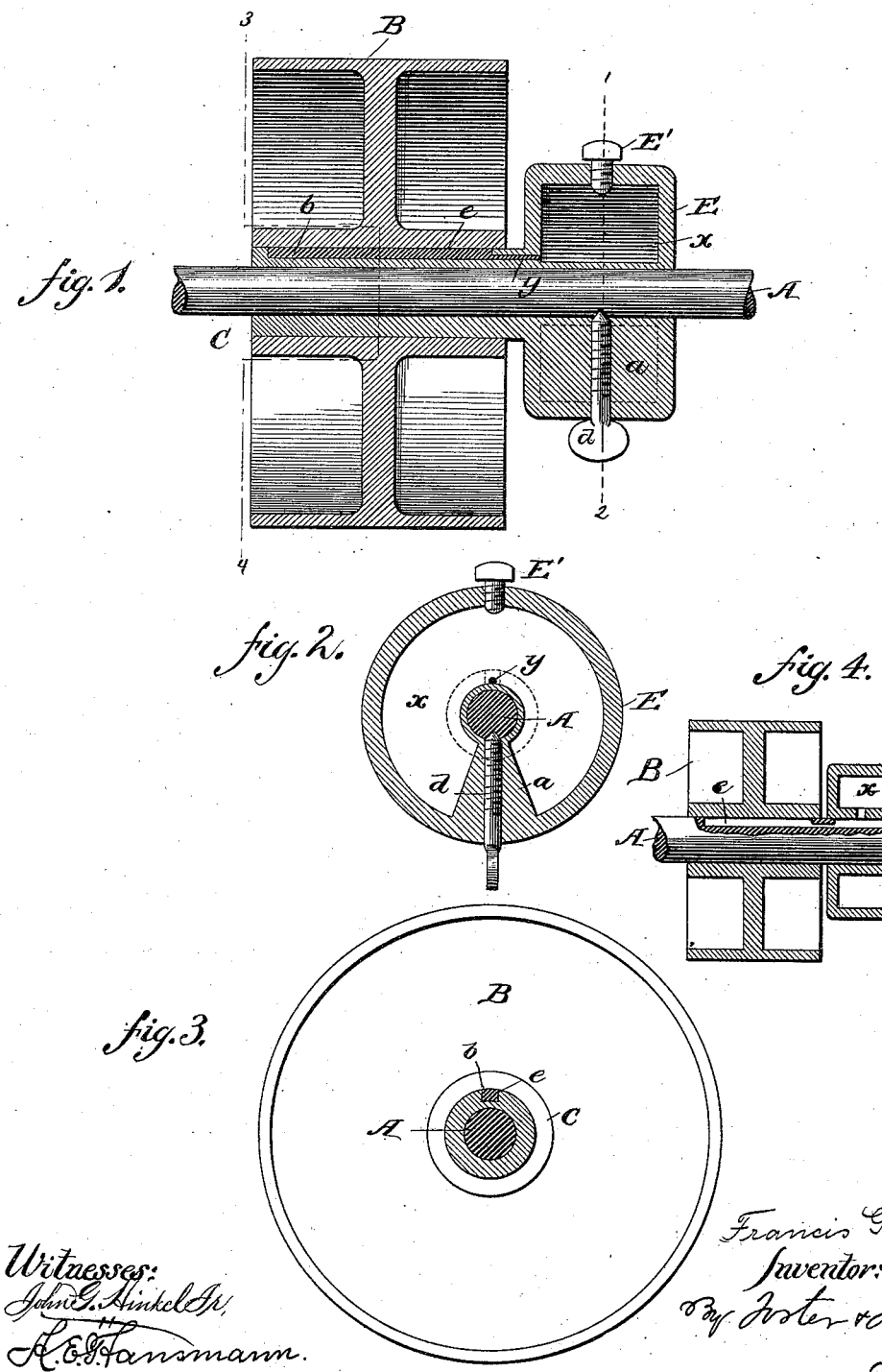

UNITED STATES PATENT OFFICE.

FRANCIS GLEASON, OF PHILADELPHIA, PENNSYLVANIA.

LOOSE-PULLEY LUBRICATOR.

SPECIFICATION forming part of Letters Patent No. 310,669, dated January 13, 1885.

Application filed October 27, 1884. (No model.)

*To all whom it may concern:*

Be it known that I, FRANCIS GLEASON, a citizen of the United States, residing at Philadelphia, in the county of Philadelphia and State of Pennsylvania, have invented certain new and useful Improvements in Lubricating Devices for Loose Pulleys, of which the following is a specification.

My invention has for its object to effectively lubricate that class of pulleys, disks, gears, &c., which revolve loosely upon stationary or movable shafts or studs; and my invention consists of an oil-casing provided with a lateral sleeve and adapted for attachment to a shaft and as a bearing for the loose pulley, the said sleeve having a slot communicating with the oil-chamber through a channel, whereby the oil in the said chamber can be conducted between the faces of the sleeve and pulley.

In the drawings, Figure 1 is a longitudinal section showing the shaft with a loose pulley and my improved lubricating device. Fig. 2 is a section on the line 1 2, Fig. 1; Fig. 3, a section on the line 3 4, Fig. 1; Fig. 4, a modification.

A represents the shaft or bearing for the loose or idler pulley or disk or gear B. The said shaft may be adapted to revolve in suitable bearings, or it may be a fixed shaft or stud. The pulley B, instead of revolving directly upon the shaft, revolves upon a sleeve, C, which is secured to a casing or reservoir, E, arranged outside of the pulley, containing a chamber, $x$, divided by a cross-piece or partition, $a$, through which extends the screw $d$, whereby the casing is held in position upon the shaft.

In that portion of the sleeve C that is within the pulley B is a slot or groove, $e$, which does not extend completely through the sleeve, but communicates with a channel, $y$, extending through the chamber $x$, and a strip, $b$, of felt or other fibrous material, extends along the groove $e$ and through the channel $y$ into the chamber $x$.

A screw-plug, E', or other suitable stopper, is adapted to an opening in the casing E, and may be removed to permit the chamber $x$ to be filled with oil or suitable lubricant, which is carried by the fibrous material into the groove $e$ in sufficient quantities to afford an abundant supply of lubricant to the bearing-face of the pulley.

When the casing E is connected to a revolving shaft, A, the revolution of the casing carries the oil back and forth, so as to insure its contact with the lubricating-strip until the supply is completely exhausted. At the same time any gummy or gritty matter contained in the oil tends to fly outward to the periphery of the chamber and is prevented from clogging the lubricating-strip.

In cases where two pulleys must be mounted adjacent to each other upon the same shaft the chamber $x$ may be formed in the hub of the fixed pulley, from the side of which the sleeve C will extend through the hub of the loose pulley, and the channel $e$, instead of being straight, as shown, may be carried spirally around the sleeve.

It is not necessary in all cases to use the fibrous conductor, as the oil may in some instances be allowed to flow directly through the channel $y$ and groove $e$ against the bearing-face of the pulley.

It will be seen that the oil-casing E and slotted sleeve may be sold as a lubricating device adapted for attachment to shafts of standard sizes.

It is not necessary at all times for the loose pulley to revolve on a sleeve. Where it turns directly on the shaft or stud, the groove $e$ may be in the latter, as shown in Fig. 4, and the oil-casing E may be secured on the shaft to communicate with such groove.

Without limiting myself to the precise construction and arrangement of parts shown, I claim—

1. The combination, with a loose pulley, of an oil-casing upon the shaft and a channel parallel with the shaft leading from the interior of the oil-casing to the pulley-bearing, substantially as described.

2. The combination of a shaft, oil-casing, slotted sleeve extending therefrom into the hub of an adjacent pulley, and a channel forming a communication between the slot and the oil-chamber, for the purpose specified.

3. The combination, with a shaft, of an oil-casing connected thereto, and provided with a slotted sleeve extending into the hub of an adjacent pulley, and a strip of fibrous material extending from the oil-chamber into the slot of the sleeve, for the purpose set forth.

4. The combination, with a shaft or stud, A, and loose pulley, of a slotted sleeve upon the shaft constituting the bearing of the said pulley, a casing connected to the said sleeve, containing an oil-chamber communicating with the slot in the sleeve, and a strip of fibrous material extending from the said slot to the oil-chamber, substantially as set forth.

5. The casing E, containing an oil-chamber, and adapted for attachment to a shaft, and provided with a laterally-extending hollow sleeve having a groove and a channel extending from the groove into the oil-chamber, substantially as set forth.

In testimony whereof I have signed my name to this specification in the presence of two subscribing witnesses.

FRANCIS GLEASON.

Witnesses:
SAMUEL P. COURTNEY,
CHAS. R. HEMPHILL.